(No Model.)

T. SWANTON.
VAT OR KETTLE FOR REDUCING OR TREATING ANIMAL OR VEGETABLE MATTER.

No. 295,508. Patented Mar. 18, 1884.

Witnesses.
Arthur Lieperton
John F. C. Prunkert

Inventor.
Thomas Swanton
by Crosby & Gregory attys.

UNITED STATES PATENT OFFICE.

THOMAS SWANTON, OF PEABODY, MASSACHUSETTS, ASSIGNOR TO KING UPTON, OF SAME PLACE.

VAT OR KETTLE FOR REDUCING OR TREATING ANIMAL OR VEGETABLE MATTER.

SPECIFICATION forming part of Letters Patent No. 295,508, dated March 18, 1884.

Application filed October 13, 1883. (No model.)

*To all whom it may concern:*

Be it known that I, THOMAS SWANTON, of Peabody, county of Essex, State of Massachusetts, have invented an Improvement in Vats or Kettles for Reducing or Treating Animal or Vegetable Matter, of which the following description, in connection with the accompanying drawings, is a specification, like letters on the drawings representing like parts.

In vats or kettles for the manufacture of glue from animal matter and for rendering lard or tallow, and for treating barks for extracts, and in preparation of fruit, it is customary to heat and reduce, or "cook," as it may be termed, the said several substances in a vat, the bottom portion or lining of which is perforated or slotted to permit the passage through it of heat given out by a steam coil or pipe and permit the contents of the vat and reduced liquid portions of the stock to come in contact with the said steam-coil to be heated, the said bottom portion acting as a strainer to permit the liquid contents of the vat to pass away from the animal or vegetable matter in the said vat. To increase the rapidity at which the glue-stock or animal matter may be reduced or the vegetable matter be treated or steeped, and secure in a vat of a given size a more extended perforated surface through which the said liquid or reduced portions of the vat may escape from the hot mass of animal or vegetable matter in the vat, I have provided the vat with perforated or open partitions having spaces between them for the reception of the liquid or reduced stock or material, the latter being drawn from the case in the usual manner. I have also provided the vat with end pieces which are of perforated or open material, and between which and the outer casing there is left a space.

My invention consists, essentially, in a vat for treating glue-stock or animal or vegetable matter or material, a perforated bottom plate, a perforated partition having an open space between its walls, and perforated ends set to leave spaces $e$ between the said perforated ends and the end of the vat-case, substantially as described.

Figure 1:
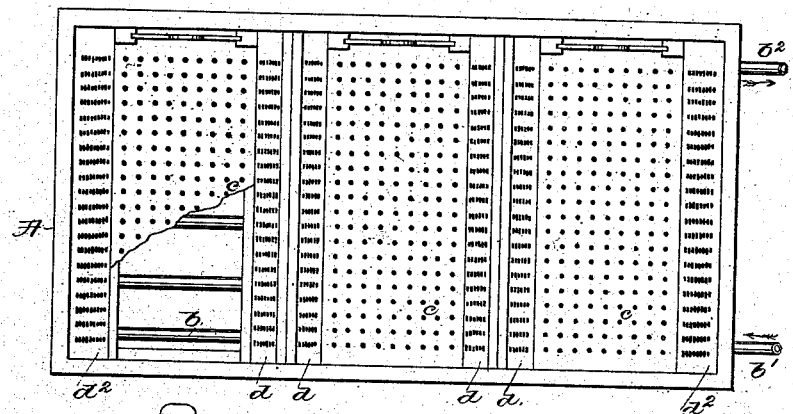
Figure 2:
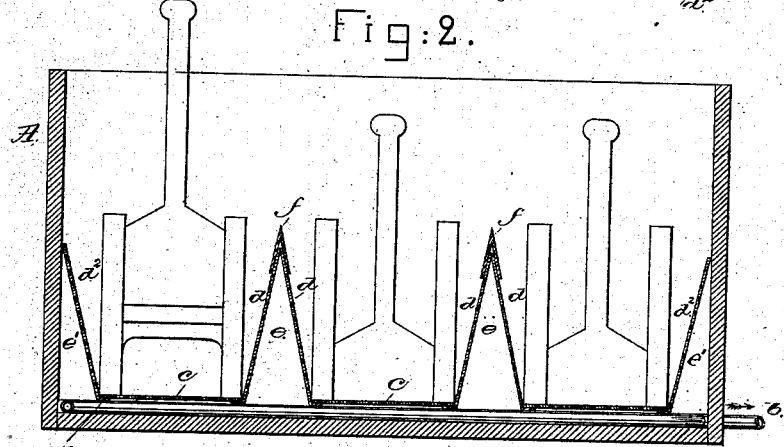

Figure 1 is a top view of a vat containing my improvements, it being shown as particularly adapted for reducing glue-stock. Fig. 2 is a longitudinal vertical section thereof, and Fig. 3 a like view of a modification.

The vat-casing A, of usual construction and material, and of suitable size, has within it a steam-pipe, $b$, which receives steam at $b'$ and discharges it at $b^2$, all as usual. The vat has an open or pervious bottom portion, $c$, of wood or of perforated sheet metal or wire netting, or metal screening, such as has been used in other vats. In connection with this usual perforated bottom portion, which I have, however, subdivided, I employ a suitable number of perforated partitions or walls, $d\ d$, which are extended into the mass of animal or vegetable matter being treated in the vat, and being rendered or reduced to liquid state or being steeped or cooked by heat conveyed into the vat by the steam-pipe $b$, there being between the said partitions a space, $e$, into which the reduced material or liquid may collect or stand. The vat near its ends has single end plates, $d^2\ d^2$, which are inclined or placed to leave a space, $e'$, between them and the main end of the vats.

In Figs. 1 and 2 the partitions are composed of perforated plates or grating having shoulders, on which rest the bottom portions, $c\ c$, and the upper ends of the plates $d\ d$ are covered by the cap $f$.

Figure 3:
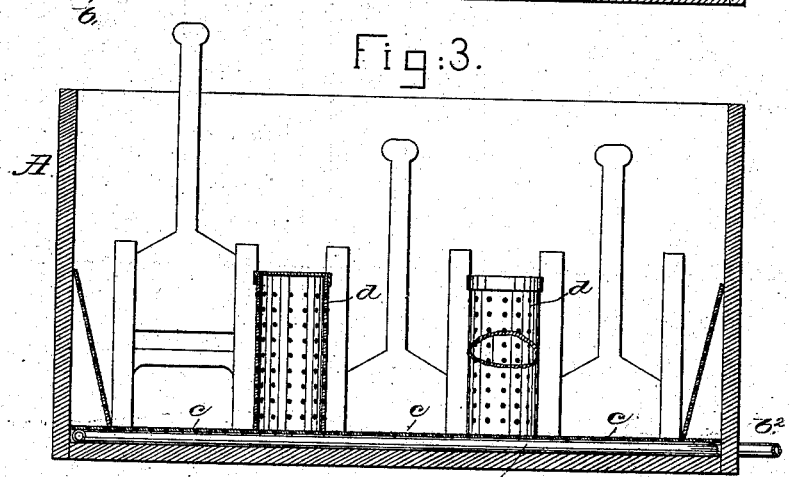

In Fig. 3 the partitions are made circular and extended up into the vat.

I claim—

In a vat for treating glue-stock or animal or vegetable matter or material, a perforated bottom plate, a perforated partition having an open space between its walls, and perforated ends set to leave spaces $e$ between the said perforated ends and the end of the vat-case, substantially as described.

In testimony whereof I have signed my name to this specification in the presence of two subscribing witnesses.

THOMAS SWANTON.

Witnesses:
GEORGE LAURANCE,
GEO. HOLMAN.